United States Patent
Haggman et al.

(10) Patent No.: US 7,091,308 B2
(45) Date of Patent: Aug. 15, 2006

(54) CHAIN EXTENDED DENDRITIC POLYETHER

(75) Inventors: Bo Haggman, Lund (SE); David James, Helsingborg (SE); Hakan Bjornberg, Angelholm (SE); Birger Midelf, Angelholm (SE)

(73) Assignee: Perstorp Specialty Chemicals AB, Perstorp (SE)

( * ) Notice: Subject to any disclaimer, the term of this patent is extended or adjusted under 35 U.S.C. 154(b) by 122 days.

(21) Appl. No.: 10/501,024

(22) PCT Filed: Jan. 22, 2003

(86) PCT No.: PCT/SE03/00117

§ 371 (c)(1),
(2), (4) Date: Sep. 14, 2004

(87) PCT Pub. No.: WO03/062306

PCT Pub. Date: Jul. 31, 2003

(65) Prior Publication Data

US 2005/0131205 A1    Jun. 16, 2005

(30) Foreign Application Priority Data

Jan. 25, 2002  (SE) .................................. 0200207

(51) Int. Cl.
C08G 59/06  (2006.01)
C08G 65/14  (2006.01)

(52) U.S. Cl. ...................................... 528/417; 528/425

(58) Field of Classification Search ................ 528/417, 528/425
See application file for complete search history.

(56) References Cited

FOREIGN PATENT DOCUMENTS

WO    0056802    9/2000

OTHER PUBLICATIONS

Macromolecules, vol. 33, 2000, Ralf Knischka et al, "Functional Poly(ethylene oxide) Multiarm Star Polymers: Core-First Synthesis Using Hyperbranched Polyglycerol Initiators" p. 315-p. 320.
Solid State Ionics, vol. 148, 2002, Masayoshi Watanabe et al, "Polymer electrolytes dervied from dendritic polyether macromonomers" p. 399-p. 404.
Macromolecules, vol. 33, 2000, Alexander Sunder et al, "Hyperbranched Polyether-Polyols Based on Polyglycerol: Polarity Design by Block Copolymerization with Propylene Oxide" p. 309-p. 314.
Polymeric materials science and engineering, vol. 75, 1996, Keith W. Pollak et al, "Nonionic Unimolecular Micelles: Poly(ethylene oxide)-coated dendrimers" p. 273-p. 274.
Polymer, vol. 43, 2002, Anna Carlmark et al, "Atom transfer radical polymerization of methyl acrylate from a multifunctional initiator at ambient temperature" p. 4237-p. 4242.

*Primary Examiner*—Duc Truong

(57) ABSTRACT

A chain extended dendritic polyether comprising a dendritic core polymer and a chain extension bonded to said core polymer, which chain extended dendritic polyether optionally is at least partially chain terminated and/or partially functionalised. The core polymer is a polyhydric dendritic polyether and the chain extension is obtained by addition of at least one alkylene oxide to at least one hydroxyl group in said core polymer.

23 Claims, No Drawings

CHAIN EXTENDED DENDRITIC POLYETHER

This application is a §371 Application of International Application No. PCT/SE03/00117, filed on Jan. 22, 2003, claiming the priority of Swedish Application No. 0200207-9, filed Jan. 25, 2002, the entire disclosures of which are incorporated herein by reference in their entireties.

The present invention refers to a chain extended dendritic polyether comprising a polyhydric dendritic core polymer and chain extension bonded to said core polymer, which chain extended dendritic polyether optionally is at least partially chain terminated and/or functionalised. Said chain extension is obtained by addition of at least one alkylene oxide. In a further aspect, the present invention refers to a composition comprising the subject chain extended dendritic polyether and in yet a further aspect to the use of the same.

Compounds with a highly branched, treelike, molecular structure have been known for a long time. Dendritic polymers belong to a group of polymers characterised by densely branched structures and a large number of end groups. They are obtained by for instance polymerisation of $AB_x$ monomers, typically $AB_2$ monomers, giving branched structures with an exponential growth in both molecular weight and end group functionality as a function of the degree of polymerisation. Polymers designated as dendritic, or sometimes hyperbranched, may to a certain degree hold an asymmetry, yet maintaining the highly branched treelike structure. Dendrimers generally are highly symmetric. Dendrimers can be said to be monodisperse species of dendritic polymers. Dendritic polymers normally consist called generations and the nucleus having one or more reactive sites and a number of branching layers and, optionally, a layer of chain terminating molecules. The layers are usually called generations and the branches dendrons, which are designations herein used. It is well known that the globular structures obtained with dendritic polymers allow for excellent flow and processing properties at high molecular weights. The exceptional concentration of reactive groups allows for rapid curing in thermosetting applications and provide unique possibilities to customise properties in a wide range of different end-uses.

Literature discussing various highly branched and dendritic molecules and macromolecule include:

"*Polybenzyl Type Polymers*", by Howard C. Haas et al published in *J. Polymer Sci.* vol. XV (1955) pp. 503–515, wherein non-randomly substituted highly branched benzyl type polymers are synthesized and analysed.

"*Strukturuntersuchungen an Sternmolekülen mit Glykogen als Kern*", by Walther Burchard et al published in *Makromolekulare Chemie*, 150 (1971) pp. 63–71, wherein the structure of molecules having treelike amylose chains and a glycogen core are disclosed.

"*Statistical Mechanism of Random Coil Networks*" and "*Elasticity and Chain Dimensions in Gaussian Networks*", by William W. Graessley published in *Macromolecules*, vol. 8 no. 2 (1975) pp. 186–190 and vol. 8 no. 6 (1975) pp 865–868, wherein molecules comprising tri and tetrafunctional central cores (initiators) and concentrically treelike (dendritic) branches are disclosed. The term micronetworks is introduced to describe these molecules.

"*Static and Dynamic Scattering Behavior of Regularly Branched Chains: A Model of Soft-Sphere Microgels*", by Walther Burchard et al published in *J. Polymer Sci. Polym. Phys. Ed.*, vol. 20 (1982) pp. 157–171, wherein is disclosed, among other models, the theory behind a molecular model comprising a trifunctional core being symmetrically branched whereby continued branch replication yields increased branch multiplicity and a increased number of terminal groups.

Various dendritic materials have during the last one or two decades attracted general attention. Patents, patent applications and other works issued or published during the last decades are summarised by for instance H. Galina et al in *Polymery;* English translation in *Int. Polym. Sci. Tech.*, 1995, 22, 70. The state of the art is excellently compiled in for instance "*Dendritic Molecules Concepts Syntheses Perspective*" by G. R. Newkome, C. N. Moorefield and F. Vögtle—VCH Verlagsgesellschaft mbH, 1996.

A number of patents and patent applications disclosing various dendritic polymers and processes for synthesis thereof have for various types of products been issued or published and include EP 0 115 771, SE 468 771, WO 93/18075, EP 0 575 596, SE 503 342, US 5,561,214, WO 00/56802.

EP 0 115 771 claims a dense star polymer having at least three symmetrical core branches, each core branch having at least on terminal group, and a ratio terminal groups to core branches being greater than 2:1. The properties of claimed polymer is specified through a comparative relation to an unspecified star polymer. EP 0 115 771 also relates to a process, which process substantially also is disclosed in US 4,410,688, for synthesis of a symmetrical dense start polymer. The process teaches a repeated and alternately addition of alkyl acrylate and alkylene diamine to a core consisting of ammonia.

SE 468 771 discloses a dendritic macromolecule substantially built up from polyester units and a process for synthesis of said macromolecule. The macromolecule is composed of an initiator, having at least on hydroxyl group, to which initiator at least one branching generation comprising at least one chain extender, having at least one carboxyl group and at least two hydroxyl groups, is added. The macromolecule is optionally chain terminated. The process for synthesis of said macromolecule teaches a co-esterification of the initiator and the chain extender, optionally followed by a chain termination. The process yields inexpensive polydisperse dendritic macromolecules.

WO 93/18075 teaches a hyperbranched polymer having at least six terminal hydroxyl or carboxyl groups and a process for its synthesis. The hyperbranched polymer is synthesized by repeated and alternately addition of a compound having at least one anhydride group followed by a compound having at least one epoxide group to a core having at least one hydroxl group.

EP 0 575 596 discloses a dendritic macromolecule comprising a core having 1–10 functional groups and branches synthesized from vinyl cyanide units as well as a process for synthesis thereof. The process involves three repeated steps beginning with reaction between the core and monomeric vinyl cyanide units followed by reduction of incorporated nitrile groups to amine groups. In a third step said amine groups are reacted with monomeric vinyl cyanide units.

SE 503 342 discloses a dendritic macromolecule of polyester type and a process for synthesis of said macromolecule. The macromolecule substantially is composed of a core, having at least one epoxide group, to which core at least one branching generation comprising at least one chain extender, having at least three reactive functions of which at least one is a carboxyl or epoxide group and at least one is a hydroxyl group, is added. The macromolecule is optionally chain terminated. The process teaches self condensation of the chain extender molecules yielding a dendron (a core branch), which dendron in a second step is added to the core. The process also comprises an optional further chain extension by addition of spacing or branching chain extenders and/or an optional chain termination. The process yields inexpensive polydisperse dendritic macromolecules.

WO 00/56802 discloses dendritic polyethers obtained by ring opening polymerisation of oxetanes, optionally in the presence of a core molecule. The polyethers are optionally further processed such as chain extended, chain terminated and/or functionalised by reaction with compounds such as hydroxyfunctional carboxylic acids, lactones, carboxylic acids, haloperoxyacids, isocyanates, allylhalides and epihalohydrins.

Dendritic polyethers made by ring opening polymerisation have attracted some interest recently. Both dendritic structures made from glycidol and 3-ethyl-3-hydroxmethyl oxetane have been studied and published by inter alia E. J. Vandenberg, *Pol. Sci., Part A: Polym. Chem.*, 1989, 27, 3113, A. Sunder et.al., *Macromolecules*, 1999, 32, 4240, and H. Magnusson et.al. *Macromol. Rapid Commun.*, 1999, 20, 453–457.

Dendritic polyethers obtained by ring opening polymerisation offer a rapid process for obtaining dendritic structures. Dendritic polyethers are furthermore hydrolytically stable, which is of interest for applications wherein an aqueous and/or alkaline environment is employed.

It is of particular interest to study dendritic polyethers made by ring opening polymerisation of 3-ethyl-3-hydroxymethyl oxetane (trimethylolpropane oxetane, TMPO), since the monomer is non-toxic and hence environmentally friendly. The TMPO monomer is, furthermore, only possible to polymerise under cationic conditions, which allows the hydroxyl functionality to be modified under alkaline conditions prior to polymerisation. Said modified product can then be used as co-monomer with neat TMPO and specific functionalities can thereby be incorporated in the inherent dendritic polymer backbone. Dendritic polymers made from TMPO offer interesting physical properties such as a glasstransition temperature (Tg) in the range of 40° C., yet low melt viscosity at elevated temperatures. They are also as previously disclosed hydrolytically stable and can be used in strongly alkaline environments.

It has now been found that it is possible, in spite of the high functionality and molecular weight, to use hydroxyfunctional dendritic polyethers as core molecules which through anionic ring opening are linearly extended with cyclic ethers of oxirane type, whereby chain extended dendritic polyethers with terminal hydroxyl groups and narrow molecular weight distribution are obtained.

The present invention accordingly refers to novel chain extended dendritic polyether comprising a dendritic core polymer and a substantially linear chain extension bonded to said core polymer. The chain extended dendritic polyether may optionally be at least partially chain terminated and/or functionalised. The core polymer is a polyhydric dendritic polyether and the chain extension is obtained by addition of at least one alkylene oxide to at least one hydroxyl group in said core polymer. The preferred molar ration said core polymer to said alkylene oxide is between 1:1 to 1:100, such as between 1:3 and 1:50. The novel dendritic polymer of the present invention useful as a product per se or as component, raw material, in the manufacture of a large number of resinous and polymeric products.

The chain extended dendritic polyether according to the present invention has exceptionally low viscosity with regard to its molecular weight. Obtained viscosity range is regarded as being the lowest values reported for any polydisperse dendritic polymer at a given molecular weight and hydroxyl functionality. The chain extended dendritic polyether according to the present invention has, furthermore, an inherently flexible backbone promoting good flexibility and adhesion to coatings as well as thermoset resins. The high end group functionality provides, at the same time excellent film hardness and modulus retention to coatings and thermoset resins. The chain extended dendritic polyether according to the present invention provides a unique amphiphilic character. Obtained linear alkylene oxide chains will, when using for instance ethylene oxide as chain extending monomer, since they are hydrophilic provide inherent surfactant and stabilising properties. The high end group functionality of the chain extended dendritic polyethers according to the invention, allows for chain stoppers of hydrophobic nature, such as aliphatic mono isocyanates or carboxlic acids, to be used to provide the dendritic polyether with an amphiphilic nature. The amphiphilic products obtained have unexpectedly been found to be exceptionally effective as dispersing agents for pigments and as dispersing resins for alkyds, polyesters, polyurethanes and polymer dispersions obtained by emulsion polymerisation. Dispersing products are obtained when unsaturated carboxylic acids, such as sunflower fatty acid, tall oil fatty acid or linseed fatty acid, are used, which dispersing products when mixed with dryers will contribute to crosslinking of formed films. Coatings with good rheological properties and excellent final film properties can hence be obtained without the use of solvents, coalescing agents and/or conventional surfactants. Radiation curing polymers with high functionality, high molecular weight and low viscosity are obtained when unsaturated carboxylic acids, such as acrylic and maleic acids, are used.

The alkylene oxide providing the substantially linear chain extension is in preferred embodiments of the present invention ethylene oxide, propylene oxide, 1,3-butylene oxide, 2,4-butylene oxide, cyclohexene oxide, butadiene monoxide, phenylethylene oxide or a mixture of two or more of said alkylene oxides.

The polyhydric dendritic polyether, used as core polymer according to the present invention, is preferably obtained by ring opening addition of at least on oxetane to a di, tri or polyhydric core molecule at a molar ratio yielding a polyhydric dendritic polyether comprising a core molecule and at least one branching generation bonded to at least one hydroxyl group in said di, tri or polydydric core molecule. The di, tri or polyhydric core molecule is in preferred embodiments of the polyhydric dendritic polyether a di, tri or polyhydric alcohol or a reaction product between at least one alyklene oxide, such as ethylene oxide, propylene oxide, 1,3-butylene oxide, 2,4-butylene oxide, cyclohexene oxide, butadiene monoxide and/or phenylethylene oxide, and a di, tri or polyhydric alcohol. Said di, tri or polyhydric alcohol is suitably selected from the group consisting of 1,ω-diols, 5-hydroxy-1,3-dioxanes, 5-hydroxyalkyl-1,3-dioxanes, 5-hydroxyalkyl-1,3-dioxanes, 5,5-di(hydroxyalkyl)-1,3-dioxanes, 2-alkyl-1,3-propanediols, 2,2-dialkyl-1,3-propanediols, 2-hydroxy-1,3-propanediols, 2-hydroxy-2-alkyl-1,3-propanediols, 2-hydroxyalkyl-2-alkyl-1,3-propanediols, 2,2-di(hydroxyalkyl)1,3-propanediols and dimers, trimers or polymers of said di, tri or polyhydric alcohols. Alkyl is here preferably $C_1$–$C_{24}$, such as $C_1$–$C_{12}$ or $C_1$–$C_8$ alkanyl or alkenyl.

Various embodiments of the polyhydric dendritic polyether include especially preferred embodiments wherein the di, tri or polyhydric core molecule is 1,4-butanediol, 1,5-pentanediol, 1,6-hexanediol, 1,6-cyclohexanedimethanol, 5,5-dihydroxymethyl-1,3-dioxane, 2-methyl-1,3-propanediol, 2-methyl-2-ethyl-1,3-propanediol, 2-ethyl-2-butyl-1,3-propanediol, neopentyl glycol, dimethylolpropane, 1,1-dimethylolcyclohexane, glycerol, trimethylolethane, trimethylolpropane, diglycerol, distrimethyloethane, ditrimethylolpropane, pentaerythritol, dipentaerythritol, anhydroenneahepitol, sorbitol, mannitol or a reaction between a previously disclosed alkylene oxide and a herein disclosed alcohol.

The oxetane providing said at least one branching generation is preferably and advantageously a 3-alkyl-3-(hydroxyalkyl)oxetane, a 3,3-di(hydroxyalkyl)oxetane, a 3-alkyl-3-(hydroxy-alkoxy)oxetane, a 3-alkyl-3-(hydroxyalkoxyalkyl)oxetane or a dimer, trimer or polymer of a 3-alkyl-3-(hydroxyalkyl)oxetane, a 3,3-di(hydroxyalkyl)oxetane, a 3-alkyl-3-(hydroxyalkoxy)-oxetane or a 3alkyl-3-(hydroxyalkoxyalkyl)oxetane. Alkyl is her preferably $C_1$–$C_{24}$, such as $C_1$–$C_{12}$ or $C_1$–$C_8$ alkanyl or alkenyl and alkoxy comprises preferably 1–50, such as 2–20, alkoxy units derived from at least one alkylene oxide, such as ethylene oxide, propylene oxide, 1,3-butylene oxide, 2,4-butylene oxide, cyclohexene oxide, butadiene monoxide, phenylethylene oxide or a mixture of two or more of said alkylene oxides. Said oxetane is most preferably an oxetane of trimethylolethane, trimethylolpropane, pentearythritol, ditrimethylolethane, ditrimethylolpropane or dipentaerythritol, such as 3-methyl-3-(hydroxy-methyl)oxetane, 3-ethyl-3-(hydroxymethyl)oxetane and/or 3,3-di(hydroxymethyl)oxetane.

The chain extended dendritic polyether of the present invention is suitably at least partially chain terminated by addition to said chain extension and/or said core polymer of at least one aliphatic or aromatic saturated or unsaturated carboxylic acid or a corresponding anhydride or halide, at least one hydroxyfunctional carboxylic acid, such as 2,2-bis(hydroxymethyl)propanoic acid, 2,2-bis(hydroxymethyl)butanoic acid, 2,2-bis(hydroxmethyl)pentanoic acid, 2,3-dihydroxy-propanoic acid, hydroxpentanoic acid, hydroxypropanoic acid and/or 2,2-dimethyl-3-hydroxypropanoic acid, at least one lactone, such as β-propiolactone, γ-butyrolactone, δ-valerolactone, ε-caprolactone and/or ζ-enantholactone, at least one aliphatic or aromatic mono or diisocyanate, such as toluene-2,4-diisocyanate, toluene-2,6-diisocyanate, hexamethylene diisocyanate and/or isophorone diisocyanate, at least one epoxidised saturated or unsaturated alcohol, such as a $C_5$–$C_{24}$ alkanol or alkenol, at least one allyl or vinylether, at least one thiol, at least one glycidyl ether, and/or at least one sulphonate or phosphate, and/or is at least partially functionalised by reaction with at least haloperoxy acid or anhydride, such as peroxyformic acid, peroxyacetic acid, peroxybenzoic acid, m-chloroperoxybenzoic acid and/or trifluoroperoxyacetic acid, at least one allyhalide, such as allybromode and/or allychloride, and/or at least one epihalohydrin, such as epichlorohydrin or epidbromohydrin.

Said at least one aliphatic or aromatic carboxylic acid is suitable acetic acid, propionic acid, butyric acid, valeric acid, isobutyric acid, trimethylacetic acid, 2-ethylhexanoic acid, nonanoic acid, isononanoic acid, heptanoic acid, caproic acid, caprylic acid, capric acid, benzoic acid, para-tert.butylbenzoic acid, pelargonic acid, lauric acid, myristic acid, palmitic acid, stearic acid, isotearic acid, behenic acid, lignoceric acid, cerotic acid, montanoic acid, abietic acid, sorbinic acid, oleic acid, ricinoleic acid, linoleic acid, linolenic acid, erucic acid, soybean fatty acid, linseed fatty acid, dehydrated castor fatty acid, tall oil fatty acid, tung oil fatty acid, sunflower fatty acid, safflower fatty acid, o-phthalic acid, isophthalic acid, terephtalic acid, azeleic acid, adipic acid and/or trimelletic acid or, where applicable, a to a said acid corresponding anyhydride.

Said at least one carboxylic acid is furthermore preferably acrylic acid, methacrylic acid, crotonic acid, isocrotonic acid or a to a said acid corresponding anhydride or halide, and/or maleic anhydride or fumaric acid. Said at least partial chain termination confers, when performed by addition of at least one of said preferred acids, properties possible to utilise in for instance radiation curing coatings and inks.

The present invention refers in a further aspect to a composition comprising the chain extended dendritic polyether disclosed above in an amount of at least 0.1%, such as 0.5–80%, 0.5–50% or 1–25%, by weight.

Various embodiments of the chain extended dendritic polyether of the present invention are suitably and advantageously used as or utilised in preparation of air drying allyd resins, 1-and 2-component polyurethane coatings and adhesives, saturated and unsaturated polyesters, toughening agents for thermosetting resins, such as epoxy resins, unsaturated polyester, vinyl esters, polyurethanes, maleimides, cyanate esters, phenolics, uera-formaldehyde resins and melamine-formaldehyde resins as well as composites made therefrom, pigment dispersion agents for solvent-free, solventborne and waterborne coatings, water dispersible resins for alkyd emulsions, acrylic dispersions and polyurethane dispersions, dispersing polymers or resins, such as reactive polymeric surfactants, for non-amphifilic alkyds, polyesters, polyethers and polyurethanes, processing aids for polyolefines and thermoplastics, such as polycarbonates, polyesters, polyamides, polyimides and polyurethanes, concrete admixtures imparting for instance fluidity to hydraulic compositions, such as cement pastes, mortars and concretes, and/or radiation curing coatings, printing inks and adhesives.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. These and other objects and the attendant advantages will be more fully understood from the following detailed description, taken in conjunction with appended embodiment Examples 1–19 illustrating:

Examples 1 and 2: Preparation second and third generation dendritic polyethers used in Example 3–6 as core polymers.

Examples 3 and 4: Preparation of chain extended dendritic polyethers in accordance with embodiments of the present invention. The product of Example 1 is used as core polymer and ethylene oxide as chain extension monomer.

Examples 5 and 6: Preparation of chain extended dendritic polyethers in accordance with embodiments of the present invention. The product of Example 2 is used as core polymer and ethylene oxide as chain extension monomer.

Example 7 and 8: Chain termination, in accordance with embodiments of the present invention, of the chain extended dendritic polyethers of Examples 3 and 5. Acrylic acid is used as chain termination monomer.

Example 9: Chain termination, in accordance with an embodiment of the present invention, of the chain extended dendritic polyether of Example 4. Sunflower fatty acid is used as chain termination monomer.

Example 10 and 11: Evaluation in radiation curing coatings of the products obtained in Examples 7 and 8.

Example 12: Evaluation as toughener in anhydride cured epoxy resin of the products obtained in Example 5.

Example 13–18: Preparation of waterborne systems using the product obtained in Example 9.

Example 19: Evaluation of waterborne systems obtained in Examples 14–18.

Example 1

7.28 kg of ethoxylated pentaerythritol (Polyol PP50", Perstorp Specialy Chemicals AB) and 71.7 g of $BF_3$ ethyl etherate were charged to a steel reactor equipped with stirrer, oil heating, water cooling, nitrogen inlet and cooler. The mixture was heated to 110° C. Forced cooling was imposed to the reactor and addition of 28.55 kg of a 3-ethyl-3-(hydroxymethyl)oxetane (TMPO) commenced at a feeding rate of 0.82 $kgm^{-1}$. The reaction was exothermic and the exotherm continued for a further 20 minutes after completed feeding of TMPO and excessive cooling was required. The reaction was then allowed to continue at 110° C. for a further 4 hours after which 125 g of aqueous NaOH (41%) was added to stop the living character of the polymer. The reaction mixture was stirred for 20 minutes at 110° C. and full vacuum was then applied to remove any residual monomer and water originating from the aqueous base.

Obtained polyhydric dendritic polyether of two generations exhibited following properties:

| | |
|---|---|
| Hydroxyl value, mg KOH/g: | 518 |
| Molecular weight, (GPC) g/mole: | 1450 |
| Nominal molecular weight, (GPC) g/mole: | 1088 |
| Polydispersity index: | 1.33 |

Example 2

3.64 kg of ethoxylated pentaerythritol (Polyol PP50$^{98}$, Perstorp Specialty Chemicals AB) and 73.7 g of $BF_3$ ethyl etherate were charged to a steel reactor equipped with stirrer, oil heating, water cooling, nitrogen inlet and cooler. The mixture was heated to 110° C. Forced cooling was imposed to the reactor and addition of 33.2 kg of a 3-ethyl-3-(hydroxymethyl)oxetane (TMPO) commenced at a feeding rate of 0.82 $kgm^{-1}$. The reaction was exothermic and the exotherm continued for a further 20 minutes after completed feeding of TMPO and excessive cooling was required. The reaction was then allowed to continue at 110° C. for a further 4 hours after which 405 g of aqueous NaOH (41%) was added to stop the living character of the polymer. The reaction mixture was stirred for 20 minutes at 110° C. and full vacuum was then applied to remove any residual monomer and water originating from the aqueous base.

Obtained polyhydric dendritic polyether of three generations exhibited following properties:

| | |
|---|---|
| Hydroxyl value, mg KOH/g: | 496 |
| Molecular weight, (GPC) g/mole: | 3006 |
| Nominal molecular weight, (GPC) g/mole: | 2362 |
| Polydispersity index: | 1.27 |

Example 3

35.5 kg of the polyhydric dendritic polyether obtained in Example 1 was heated to 80° C. and an aqueous solution of KOH was charged in an amount corresponding to 357 g of neat KOH. The reaction mixture was stirred at said temperature for 1 hour, after which the alcoholate of the product obtained in Example 1 was considered to have formed. Full vacuum was then applied and the temperature was gradually increased to 110° C. to remove any water present in the alcoholate mixture. 28.8 kg of ethylene oxide was now under pressure and nitrogen atmosphere charged to the reaction mixture during 1.5 hour and the temperature was kept at 110–120° C. The reaction was allowed to continue at 110° C. for a further 3 hours after completed feeding of ethylene oxide. The reaction product was then cooled to 80° C. and sulphuric acid was added in stoichiometric amounts to previously charged KOH. $K_2SO_4$ precipitated from the solution and was removed by filtration, after which the final product was recovered.

Obtained chain extended dendritic polyether exhibited following properties:

| | |
|---|---|
| Hydroxyl value, mg KOH/g: | 291 |
| Average hydroxyl functionality, eq: | 14.1 |
| Peak molecular weight (GPC), g/mole: | 2723 |
| Molecular weight (GPC), g/mole: | 2575 |
| Nominal molecular weight (GPC), g/mole: | 2033 |
| Polydispersity index (PDI): | 1.27 |
| Viscosity (25° C., Brookfield), mPas: | 9200 |
| Non-volatile content, % by weight: | 99.5 |

Example 4

Example 3 was repeated with the difference that 86.5 kg of ethylene oxide was charged instead of 28.8 kg and that the feeding time was 3 hrs instead of 1.5 hr.

Obtained chain extended dendritic polyether exhibited following properties:

| | |
|---|---|
| Hydroxyl value, mg KOH/g: | 150 |
| Average hydroxyl functionality, eq: | 10.8 |
| Peak molecular weight (GPC), g/mole: | 4052 |
| Molecular weight (GPC), g/mole: | 4181 |
| Nominal molecular weight (GPC), g/mole: | 3153 |
| Polydispersity index: | 1.33 |
| Viscosity (25° C., Brookfield), mPas: | 2200 |
| Non-volatile content, % by weight: | 99.5 |

Example 5

36.5 kg of the polyhydric dendritic polyether obtained in Example 2 was charged to a reactor and heated to 80° C. and an aqueous solution of KOH was charged in an amount corresponding to 450 g of neat KOH. The reaction mixture was stirred at said temperature for 1 hour, after which the alcoholate of the product obtained in Example 1 was considered to have formed. Full vacuum was then applied and the temperature was gradually increased to 110° C. to remove any water present in the alcoholate mixture. 28.8 kg of ethylene oxide was now under pressure and nitrogen atmosphere charged to the reaction mixture during 1.5 hour and the temperature was kept at 110–120° C. The reaction was allowed to continue at 110° C. for a further 3 hours after completed feeding of ethylene oxide. The reaction product was then cooled to 80° C. and sulphuric acid was added in stoichiometric amounts to previously charged KOH. $K_2SO_4$ precipitated from the solution and was removed by filtration, whereafter the final product was recovered.

Obtained chain extended dendritic polyether exhibited following properties:

| | |
|---|---|
| Hydroxyl value, mg KOH/g: | 289 |
| Average hydroxyl functionality, eq: | 32.2 |
| Peak molecular weight (GPC), g/mole: | 6362 |
| Molecular weight (GPC), g/mole: | 5204 |
| Nominal molecular weight (GPC), g/mole: | 2690 |
| Polydispersity index: | 1.93 |
| Viscosity (25° C., Brookfield), mPas: | 22000 |
| Non-volatile content, % by weight: | 99.5 |

Example 6

Example 5 was repeated with the difference that 86.5 kg of ethylene oxide was charged instead of 28.8 kg and that the feeding time was 3 hrs instead of 1.5 hr.

Obtained chain extended dendritic polyether exhibited following properties:

| | |
|---|---|
| Hydroxyl value, mg KOH/g: | 149 |
| Average hydroxyl functionality, eq: | 18.6 |
| Peak molecular weight (GPC), g/mole: | 7001 |
| Molecular weight (GPC), g/mole: | 6045 |
| Nominal molecular weight (GPC), g/mole: | 2607 |
| Polydispersity index: | 2.32 |
| Non-volatile content, % by weight: | 99.5 |

Example 7

80.0 g of the chain extended dendritic polyether according to Example 2, 32.1 g of acrylic acid (10%) by weight in excess to the stoichiometric ratio) and 115 ml of toluene were at room temperature charged to a reactor. The temperature was raised to 55° C. and 1500 ppm of 4-methoxyphenol and 300 ppm of nitrobenzene were added. 1.1 g of methan sulphonic acid was added when a clear solution was obtained. The temperature was now slowly raised to 110° C. and maintained to reflux. Air was allowed to bubble through the reaction mixture to avoid gelation. The acid value was after 7 hours 62 mg KOH/g and the reaction was stopped. The reaction mixture was cooled to room temperature and the product filtered through a glass filtre. The reaction mixture was neutralised to pH 7 with a 4% aqueous solution of NaOH. Separation between the aqueous phase and the organic phase occurred almost instantaneously and the organic phase was washed 3 times with water (product: toluene/water=2:1). Remaining toluene was finally vaporised at 40° C. and <10 mm Hg for 1 hour and the final product was recovered.

Obtained chain terminated chain extended dendritic polyether (chain extended dendritic polyether acrylate) exhibited following properties:

| | |
|---|---|
| Final acid value, mg KOH/g: | 2.5 |
| Acrylate concentration, mmole/g: | 3.2 |
| Peak molecular weight (GPC), g/mole: | 4947 |
| Molecular weight (GPC), g/mole: | 4125 |
| Nominal molecular weight (GPC), g/mole: | 2610 |
| Polydispersity index: | 1.58 |
| Viscosity (25° C., 30 s$^{-1}$, Cone and Plate), mPas: | 1100 |
| Non-volatile content, % by weight: | 95.6 |

Example 8

Example 7 was repeated with the difference that the chain extended dendritic polyether of Example 5 was used instead of the chain extended dendritic polyether of Example 3.

Obtained chain terminated chain extended dendritic polyether (chain extended dendritic polyether acrylate) exhibited following properties:

| | |
|---|---|
| Final acid value, mg KOH/g: | 4.2 |
| Acrylate concentration, mmole/g: | 4.7 |
| Peak molecular weight (GPC), g/mole: | 6783 |
| Molecular weight (GPC), g/mole: | 6826 |
| Nominal molecular weight (GPC), g/mole: | 3387 |
| Polydispersity index): | 2.01 |
| Viscosity (25° C., 30 s$^{-1}$, Cone and Plate), mPas: | 2300 |
| Non-volatile content, % by weight: | 97 |

Example 9

90.0 g of sunflower fatty acid was charged to a reactor equipped with stirrer, water removal trap of Dean-Stark type, cooler, temperature control, electric heater and nitrogen purge. The fatty acid was during 1 hour heated to 80° C. 200 g of the chain extended dendritic polyether of Example 4, 2.9 g of benzoic acid and 21.0 g of xylene were charged to the heated fatty acid. The reaction mixture was now during 1 hour heated to 175° C. at which temperature reflux commenced. The reaction was allowed to continue for a further 12 hours. The temperature was gradually increased, to maintain good reflux, until a final reaction temperature of 195° C. was reached. Full vacuum was applied, when the reaction mixture had reached an acid value of approx. 7 mg KOH/g, to remove any residual solvent from the reaction mixture. The reaction mixture was then cooled to 50° C. and a filtering aid (celite) was added. Finally, the reaction mixture was passed through a pressurised filter and the final product was obtained.

Obtained chain terminated chain extended dendritic polyether (chain extended dendritic polyether alkyd) exhibited following properties:

| | |
|---|---|
| Final acid value, mg KOH/g: | 6.6 |
| Hydroxyl value, mg KOH/g: | 56 |
| Molecular weight (GPC), g/mole: | 7667 |
| Nominal molecular weight (GPC), g/mole: | 3324 |
| Polydispersity index): | 2.31 |
| Viscosity (Brookfield, 23° C.), mPas: | 2570 |
| Non-volatile content, % by weight: | 99.5 |

Example 10

The chain extended dendritic polyether acrylates obtained in Examples 7 and 8 were mixed with 4% by weight of Irgacure$^{260}$ 500 (photoinitiator, CIBA, Switzerland) and evaluated as clear coatings. The coatings were produced by the K-bar 12 μm on metal plates and passed 6 times under a 80 W/cm mercury bulb lamp in a Wallace Knight Unit. Obtained cured coatings were characterised by pendulum hardness (König pendulum), pencil hardness and Erichsen flexibility. Surface conversion of the double bonds was monitored by FTIR attenuated reflectance (Nicolet Protégé)

by monitoring the decrease of the double bond absorbency at 810 cm$^{-1}$ and by using the carbonyl peak at 1715 cm$^{-1}$ as internal reference.

Crosscut test of coatings cured under the same conditions was done on corona treated polyethylene in order to evaluate the adhesion and ranked as follows:

| ▦ | ▦ | ▨ | ▥ | ▫ | □ |
|---|---|---|---|---|---|
| 5: Intact | 4 | 3 | 2 | 1 | 0: Bad |

A comparison with a tetrafunctional amine modified polyether (Reference), characterised by a molecular weight of 1000 g/mole and a viscosity of 3 Pa.s at room temperature, was furthermore made. 4–7 times higher molecular weights at lower or similar viscosity and similar acrylate concentrations (approx. 4.0 mmole/g) were obtained with products according to the present invention compared with the reference acrylate. Similar or higher flexibility, higher pendulum hardness, similar or higher chemical resistance and improved adhesion on polyethylene were obtained with products according to Examples 7 and 8 compared to the Reference.

The result of the evaluation is given in Table 1 below.

Example 11

The chain extended dendritic polyether acrylates obtained in Examples 7 and 8 and the reference mentioned in Example 10 were mixed with an alkoxylated pentaerythritol acrylate (Ebercryl® 40, UCB Chemicals, Belgium) at a weight ratio 50:50. The formulations were cured with 2% Irgacure®500 (photoinitiator, CIBA, Switzerland) and evaluated, at a filmthickness of 12 μm, as in Example 10.

Higher chemical resistance and improved adhesion is obtained with products according to Examples 7 and 8 compared to the Reference.

The result of the evaluation is given in Table 2 below.

Example 12

The chain extended dendritic polyether according to example 5 was evaluated as toughener in an anhydride cured epoxy resin.

5 parts and 10 parts, respectively, of the chain extended dendritic polyether according to Example 5 were at room temperature added to and mixed into 100 parts of a bisphenol-A type of epoxy (LY556, Vantico, Switzerland). Opaque solutions were obtained. 90 parts of an anhydride hardener (HY917, Vantico, Switzerland) and 1 part of an imidazole accelerator (DY070, Vantico, Switzerland) were then mixed with the opaque mixtures and the mixtures became fully transparent.

A reference was also prepared in the same manner as above, with the difference that the chain extended dendritic polyether according to Example 5 was excluded.

The mixtures were subsequently poured into steel moulds with dimensions according to the required specimen size for tensile testing and fracture toughness evaluation. The filled moulds were first degassed in a vacuum oven to remove entrapped air and then cured according to the following curing schedule:

RT=>1.5° C./min=>80° C.=>4hrs at 80° C.=>1.5° C./min=>140° C.=>6hrs at 140° C.=>–0.3° C./m=>RT The cured specimens were free of defects when demoulded and fully transparent. The cured specimens were then machined to dumb bell shape according to standards for evaluation of tensile properties. Fracture touchness was also evaluated with specimens machined into the shape required for the compact tension test.

Mechanical properties obtained with specimens comprising the chain extended dendritic polyether according to Example 5 and the Reference are given in Table 3 below.

Example 13

The product of Example 9 was used to prepare a self emulsifying waterborne alkyd emulsion having following composition:

| | |
|---|---|
| 1. Product according to Example 9: | 40 parts |
| 2. Cobalt drier (Servosyn ® WED, 8% Co)*: | 0.3 parts |
| 3. Zirconium drier (Servosyn ® WED, 12% Zr)*: | 0.9 parts |
| 4. Distilled water: | 60 parts |

*Servo Delden B.V., The Netherlands.

Components 1–3 were mixed by stirring and water was subsequently added. The pH was adjusted to 7 by addition of an aqueous dimethylamino ethano solution (10%). A translucent emulsion was obtained. The emulsion was after 5 days at 40° C. still stable.

Obtained product exhibited following characteristics:

| | |
|---|---|
| Solid content, % by weight: | 41 |
| Viscosity (23° C., 0 s$^{-1}$, Cone and Plate), Pa · s: | 2.1 |
| Volatile organic content (VOC), %: | 0 |

Example 14

The alkyd emulsion prepared in Example 13 was used as a dispersing medium for pigments. A high concentrated pigment paste was prepared by adding, during 20 minutes in a high speed dissolver at 2000 rpm, 70 g of TiO$_2$ (Kronos®2310) to 30 g of the alkyd emulsion obtained in Example 13. The pigment paste was after 5 days at 40° C. still stable.

Obtained product exhibited following characteristics:

| | |
|---|---|
| Pigment:resin, weight ratio: | 5.8:1 |
| Solid content, % by weight: | 82 |
| Viscosity (23° C., 0 s$^{-1}$, Cone and Plate), Pa · s: | 110 |
| Viscosity (23° C., 500 s$^{-1}$, Cone and Plate), Pa · s: | 3.5 |

Example 15

An alkyd/acrylic hybrid emulsion was prepared by mixing, during 20 minutes, 30 parts of the product obtained in Example 13 with 70 parts of an acrylic dispersion (Mowilith® LDM 7451, Perstorp Clariant AB) having a solid content of 47%). Additives or coalescent agents were not used to prepare the hybrid system. The hybrid system was after 5 days at 40° C. still stable.

Obtained product exhibited following characteristics:

| | |
|---|---|
| Solid content, % by weight: | 44.9 |
| Volatile organic content (VOC), % | 0 |
| Viscosity (23° C., 0 s$^{-1}$, Cone and Plate), Pa · s: | 10 |
| Viscosity (23° C., 500 s$^{-1}$, Cone and Plate), Pa · s: | 0.3 |

Example 16

A waterborne paint formulation based on the alkyd/acrylic hybrid emulsion of Example 15 and the pigment paste of Example 14 was prepared by slowly addding 60 g of said pigment paste to 90 g of said alkyd/acrylic hyrbrid emulsion. Additives or coalescent agents were not used to prepare the hybrid system. The hybrid emulsion was after 5 days at 40° C. still stable.

Obtained product exhibited following characteristics:

| | |
|---|---|
| Solid content, % by weight: | 59 |
| Pigment:resin, weight ratio: | 1:1.12 |
| Viscosity (23° C., 0 s$^{-1}$, Cone and Plate), Pa · s: | 14 |
| Viscosity (23° C., 500 s$^{-1}$, Cone and Plate), Pa · s: | 0.55 |
| Volatile organic content (VOC), %: | 0 |

Example 17

The product of Example 9 was used to water disperse an alkyd resin intended for solvent borne systems and thus not giving a stable emulsion when water dispersed.

A 75% oil length alkyd, based on tall oil fatty acid and pentaerythritol, having a nominal molecular weight 4793 g/mole and hydroxyl value of 36 mg KOH/g was under stirring mixed with the product of Example 9 at a weight ratio 2:1. A cloudy highly viscous mixture was obtained. The same dryers as in Example 13 were subsequently added followed by addition of distilled water to a solid content of 50%. Obtained mixture was now stirred for 20 minutes resulting a stable milky emulsion. The emulsion was after 5 days at 40° C. still stable.

Obtained product exhibited following characteristics:

| | |
|---|---|
| Solid content, % by weight: | 50 |
| Viscosity (23° C., 0 s$^{-1}$, Cone and Plate)*, Pa · s | 15 |
| Viscosity (23° C., 500 s$^{-1}$)*, Pa · s: | 0.55 |
| Volatile organic content (VOC), %: | 0 |

The viscosity (s$^{-1}$, Cone and Plate) as a function of shear rate is given is Graph 1 below.

Example 18

A waterborne paint formulation based on the alkyd emulsion of Example 17 and the pigment paste prepared of Example 14 was prepared by slowly adding 60 g of said pigment paste to 90 g of said alkyd emulsion. The paint was after 5 days at 40° C. still stable.

Obtained product exhibited following characteristics:

| | |
|---|---|
| Solid content, % by weight: | 62.8 |
| Pigment:resin, weight ratio: | 1:1.24 |
| Viscosity (23° C., 0 s$^{-1}$, Cone and Plate), Pa · s: | 20 |
| Viscosity (23° C., 500 s$^{-1}$, Cone and Plate), Pa · s: | 1.2 |
| Volatile organic content (VOC), %: | 0 |

Example 19

100 µm wet films from the formulations of Examples 14–18 were coated on glass panels and dried at 23±2° C. and 55±5% relative humidity. The acrylic dispersion (Mowilith® LDM 7451, Perstorp Clariant AB) of Example 15 was used as Reference. The hardness was recorded using a König pendulum and expressed as König seconds.

The result is given in Table 4 below.

TABLE 1

| | Example 7 | Example 8 | Reference |
|---|---|---|---|
| Pendulum hardness, König secs. | 75 | 78 | 59 |
| Erichsen flexibility, mm | 4 | 4.4 | 3.2 |
| Acetone double rubs | 20 | 30 | 30 |
| Pencil hardness | 2H | 2H | 2H |
| Polyethylene adhesion | 5 | 5 | 3 |
| Water resistance, 6 hrs.** | 3 | 3 | 2 |
| Conversion, % | 100* | 100* | 90 |

*Double bond peak intensity too low for quantitative measurement, below the sensitivity of the instrument.
**Rank: 5 = No effect, 4 = Small blisters, 3 = Easy to scracth, 2 = Very low scratch resist, 1 = Lifting, 0 = Highly damaged

TABLE 2

| | Example 7 | Example 8 | Reference |
|---|---|---|---|
| Pendulum hardness, König secs. | 88 | 87 | 89 |
| Erichsen flexibility, mm | 3.9 | 4 | 3.4 |
| Acetone double rubs | 400 | >500 | 350 |
| Curl, mm | 2.3 | 1.9 | 2.3 |
| Polyethylene adhesion | 5 | 5 | 3 |
| Water resistance, 2 hrs.** | 5 | 5 | 5 |
| Water resistance, 24 hrs.** | 2 | 4 | 2 |
| Conversion, % | 100* | 100* | N.a. |

*Double bond peak intensity too low for quantitative measurement, below the sensitivity of the instrument.
**Rank: 5 = No effect, 4 = Small blisters, 3 = Easy to scracth, 2 = Very low scratch resist, 1 = Lifting, 0 = Highly damaged
N.a. = Not applicable.

TABLE 3

| | Example 5 5 pph | Example 5 10 pph | Reference |
|---|---|---|---|
| Tensile Modulus | 3.0 | 2.9 | 3.1 |
| σYield, MPa | 82.3 | 89.0 | 89.7 |
| Strain, % | 5.3 | 8.0 | 4.6 |
| Critical Stress Intensity Factor, MPa · m$^{1/2}$ | 0.55 | 0.60 | 0.46 |
| Glasstransition temperature, ° C. | 135 | 130 | 133 |

TABLE 4

|  | Ex. 14 | Ex. 15 | Ex. 16 | Ex. 17 | Ex. 18 | Ref. |
|---|---|---|---|---|---|---|
| Pendulum hardness - 24 hrs., König secs. | 18 | 10 | 10 | 46 | 32 | 42 |
| Pendulum hardness - 2 days, König secs. | 20 | 10 | 10 | 55 | 42 | 48 |
| Pendulum hardness - 5 days, König secs. | 24 | 10 | 10 | 57 | 45 | 52 |

Graph 1

Viscosity as a function of shear rate for product according to Example 17.

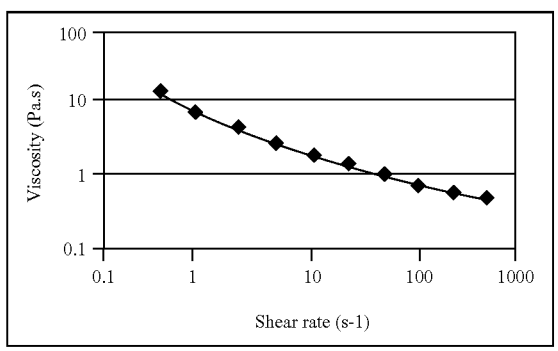

The invention claimed is:

1. A chain extended dendritic polyether comprising a dendritic core polymer and a chain extension bonded to said dendritic core polymer, which chain extended dendritic polyether optionally is at least partially chain terminated or functionalised wherein said core polymer is a polyhydric dendritic polyether obtained by ring opening addition of at least one oxetane to a di, tri or polyhydric core molecule at a molar ratio yielding a polyhydric dendritic polyether comprising a core molecule and at least one branching generation bonded to at least one hydroxyl group in said di, tri or polyhydric core molecule, and that said chain extension is obtained by addition of at least one alkylene oxide to at least one hydroxyl group in said core polymer at a molar ratio of said core polymer to said alkylene oxide of between 1:1 and 1:100.

2. A chain extended dendritic polyether according to claim 1, wherein said alkylene oxide is ethylene oxide, propylene oxide, 1,3-butylene oxide, 2,4-butylene oxide, cyclohexene oxide, butadiene monoxide, phenylethylene, oxide and mixture thereof.

3. A chain extended dendritic polyether according to claim 1 wherein said di, tri or polyhydric core molecule is a 1,ω-diol, a 5-hydroxy-1,3-dioxane, a 5-hydroxyalkyl-1,3-dioxane, a 5-alkyl-5-hydroxyalkyl-1,3-dioxane, a 5,5-di(hydroxyalkyl)-1,3-dioxane, a 2-alkyl-1,3-propanediol, a 2,2-dialkyl-1,3-propanediol, a 2-hydroxy-1,3-propanediol, a 2-hydroxy-2-alkyl-]1,3-propanediol, a 2-hydroxalkyl-2-alkyl-1,3-propanediol, a 2,2-di(hydroxyalkyl)-1,3-propanediol or a dinner, trimer or polymer of a said di, tri or polyhydric alcohol.

4. A chain extended dendritic polyether according to claim 1 wherein, said di, tri or polyhydric core molecule is 1,4-butanediol, 1,5-pentanediol, 1,6-hexanediol, 1,6-cyclohexanedimethanol, 5,5-dihydroxymethyl-1,3-dioxane, 2-methyl-1,3-propanediol, 2-methyl-2-ethyl-1,3-propanediol, 2-ethyl-2-butyl-1,3-propanediol, neopentyl glycol, dimethylolpropane, 1,1-dimethylol-cyclohexane, glycerol, trimethylolethane, trimethylolpropane, diglycerol, ditrimethylolethane, ditrimethylolpropane, pentaerythritol, dipentaerythritol, anhydroennaehepitol, sorbitor or mannitol.

5. A chain extended dendritic polyether according to claim 1, wherein said di, tri or polyhydric core molecule is a reaction product between at least one alkylene oxide and a 1,ω-diol, a 5-hydroxy-1,3-dioxane, a 5-hydroxyalkyl-1,3-dioxane, a 5-alkyl-5-hydroxyalkyl-1,3-dioxane, a 5,5-di(hydroxy-alkyl)-1,3-dioxane, a 2-alkyl-1,3-propanediol, a 2,2-dialkyl-1,3-propanediol, a 2-hydroxy-1,3-propanediol, a 2-hydroxy-2-alkyl-1,3-propanediol, a 2-hydroxalkyl-2-alkyl-1,3-propanediol, a 2,2-di(hydroxyalkyl)-1,3-propanediol or a dimer, trimer or polymer of a said di, tri or polyhydric alcohol.

6. A chain extended dendritic polyether according to claim 1, wherein said di, tri or polyhydric core molecule is a reaction product between at least one alkylene oxide and 1,4-butanediol, 1,5-pentanediol, 1,6-hexanediol, 1,6-cyclohexane dimethanol, 5,5-dihydroxmethyl-1,3-dioxane, 2-methyl-1,3-propanediol, 2,-methyl-2-ethyl-1,3-propanediol, 2,-ethyl-2-butyl-1,3-propanediol, neopentyl glycol, dimethylolpropane, 1,1-dimethylolcyclohexane, glycerol, trimethylolethane, trimethylolpropane, diglycerol, ditrimethylolethane, ditrimethylolpropane, pentaerythritol, dipentaerythritol, anhydroenneahepitol, sorbitol or mannitol.

7. A chain extended dendritic polyether according to claim 5, wherein said alkylene oxide is ethylene oxide, propylene oxide, 1,3-butylene oxide, 2,4-butylene oxide, cyclohexene oxide, butadiene monoxide and/or phenylethylene oxide.

8. A chain extended dendritic polyether according to claim 1, wherein said oxetane is a 3-alkyl-3-(hydroxyalkyl)oxetane, a 3,3-di(hydroxyalkyl)oxetane, a 3-alkyl-3-(hydroxalkoxy)oxetane, a 3-alkyl-3-(hydroxy-alkoxyalkyl)oxetane or a dimer, trimer or polymer of a 3-alkyl-3-(hydroxyalkyl)oxetane, a 3,3-di(hydroxyalkyl)oxetane, a 3-alkyl-3-(hydroxyalkoxy)oxetane or a 3-alkyl-3-(hydroxyalkoxyalkyl)oxetane.

9. A chain extended dendritic polyether according to claim 1, wherein said oxetane is 3-methyl-3-(hydroxymethyl)oxetane, 3-ethyl-3-(hydroxmethyl)oxetane or 3,3-di(hydroxymethyl)oxetane.

10. A chain extended dendritic polyether according to claim 1, wherein said oxetane is an oxetane of trimethylolethane, trimethylolporpane, pentaerythritol, ditrimethylolethane, ditrimethylolpropane or dipentaerythritol.

11. A chain extended dendritic polyether according to claim 1, wherein said dendritic polyehter is at least partially chain terminated by addition to said chain extension and/or said dendritic core polymer of at least one aliphatic or aromatic saturated or unsaturated carboxylic acid or a corresponding anhydride or halide, aliphatic or aromatic mono or diisocyanate, expoxidised saturated or unsaturated alcohol, allyl or vinylether, thiol, glycidyl ether, sulphonate or phosphate.

12. A chain extended dendritic polyether according to claim 1, wherein said dendritic polyether is at least partially chain terminated by addition to said chain extension and/or said dendritic core polymer of acrylic acid, methacrylic acid, crotonic acid, isocrotonic acid or a to said acid corresponding anhydride or halide.

13. A chain extended dendritic polyether according to claim 1, wherein said dendritic polyether is at least partially chain terminated by addition to said chain extension and/or said dendritic core polymer of acetic acid, propionic acid, butyric acid, valeric acid, isobutyric acid, trimethylacetic acid, nonanoic acid, isononanoic acid, 2-ethyl-hexanoic acid, caproic acid, caprylic acid, capric acid, heptanoic acid, benzoic acid, para-tert.butylbenzoic acid, pelargonic acid, lauric acid, myristic acid, palmitic acid, stearic acid, isostearic acid, behenic acid, lignoceric acid, cerotic acid, montanoic acid, abietic acid, sorbinic acid, oleic acid, ricinoleic acid, linoleic acid, linolenic acid, erucic acid, soybean fatty acid, linseed fatty acid, dehydrated castor fatty acid, tall oil fatty acid tung oil fatty acid, sunflower fatty acid, safflower fatty acid, o-phthalic acid, isophtalic acid, terephtalic acid, azeleic acid, adipic acid and/or trimelletic acid or to a said acid corresponding anhydride.

14. A chain extended dendritic polyether according to claim 1, wherein said dendritic polyether is at least partially functionalised by reaction with at least one selected from the group consisting of at least one allvi halide and at least one epihalohydrin.

15. A composition comprising a chain extended dendritic polyether according to claim 1, wherein said composition comprises at least 0.1% by weight of said dendritic polyether.

16. A composition comprising a chain extended dendritic polyether according to claim 1, wherein said composition is selected from the group consisting of:
   i) an air dried alkyd resin,
   ii) a 1- or 2-component polyurethane coating or adhesive,
   iii) a saturated or unsaturated polyester,
   iv) a toughening agent or thermosetting resins,
   v) a pigment dispersion agent for solvent-free, solvent-bourne and waterborne coatings,
   vi) a water dispersible resin for alkyd emulsions, acrylic dispersions polyurethane dispersions,
   vii) a dispersing polymer or resin, such as a reactive polymeric surfactant, for non-amphifilic alkyds, polyesters, polyethers and polyurethanes,
   vii) a processing aid for polyolefines and thermoplastics, such as polycarbonates, polyamides, polyester, polyimides and polyurethanes,
   ix) a concrete admixture imparting fluidity to hydraulic compositions, such as cement pastes, mortars or concretes, and
   x) a radiation curing coating, printing ink or adhesive.

17. The chain extended dendritic polyether of claim 1, wherein the molar ratio of said core polymer to said alkylene oxide is between 1:2 and 1:50.

18. The composition of claim 15, wherein said composition comprises 0.5–80% by weight of said dendritic polyether.

19. The composition of claim 15, wherein said composition comprises 0.5–50% by weight of said dendritic polyether.

20. The composition of claim 15, wherein said composition comprises 1–25% y weight of said dendritic polyether.

21. A chain extended dendritic polyether according to claim 14, wherein said at least one allyl halide is selected from the group consisting of allyl bromide and allyl chloride.

22. A chain extended dendritic polyether according to claim 14, wherein said at least one epihalohydrin is selected from the group consisting of epichlorohydrin and epibromohydrin.

23. The composition of claim 16, wherein said toughening agent is selected from the group consisting of an epoxy resins, unsaturated polyesters, vinyl esters, polyurethanes, maleimides, cyanate esters, phenolics, urea-formaldehyde resins and melamine-formaldehyde resins, and/or composites made therefrom.

* * * * *